United States Patent [19]

Stuth

[11] Patent Number: 5,030,353
[45] Date of Patent: Jul. 9, 1991

[54] SECONDARY SEWAGE TREATMENT SYSTEM

[76] Inventor: William L. Stuth, 28620 Maple Valley Highway S.E., Maple Valley, Wash. 98038

[21] Appl. No.: 559,427

[22] Filed: Jul. 23, 1990

Related U.S. Application Data

[63] Continuation of Ser. No. 7/297,294, Jan. 13, 1989, abandoned.

[51] Int. Cl.$^5$ .............................................. C02F 3/06
[52] U.S. Cl. .................................. 210/615; 210/618; 210/629; 210/151
[58] Field of Search ............ 210/150, 151, 220, 221.2, 210/537, 615, 617, 629, 618

[56] References Cited

U.S. PATENT DOCUMENTS

| Re. 27,721 | 8/1973 | Klock | 210/629 |
|---|---|---|---|
| 2,553,228 | 5/1951 | Yonner | 210/151 |
| 3,841,999 | 10/1974 | Bennett et al. | 210/617 |
| 4,043,912 | 8/1977 | Bascope et al. | 210/537 |
| 4,231,863 | 11/1980 | Sutphin | 210/615 |
| 4,420,397 | 12/1983 | Kaneko et al. | 210/615 |
| 4,599,174 | 7/1986 | McDowell | 210/615 |
| 4,627,917 | 12/1986 | Morper | 210/150 |

FOREIGN PATENT DOCUMENTS

| 57-122997 | 7/1982 | Japan . |
|---|---|---|
| 59-19584 | 2/1984 | Japan . |
| 59-15714 | 4/1984 | Japan . |
| 61-271090 | 12/1986 | Japan . |
| 62-279888 | 12/1987 | Japan . |

Primary Examiner—Stanley Silverman
Assistant Examiner—Christopher Upton
Attorney, Agent, or Firm—Harry M. Cross, Jr.

[57] ABSTRACT

A secondary sewage treatment system is provided with vertically-aligned foam collecting, turbulent, mixing, settling, and sludge collecting zones. A grating defines the boundary between the turbulent and mixing zones. Beneath the grating, a bouyant media, such as hollow plastic spheres, are contained and occupy substantially all of the mixing zone. Air diffusers including elongated draft tubes extend from the turbulent zone down through the mixing zone for introduction of air to aerate waste water liquor and to cause the aerated liquor to recirculate up into the turbulent zone, thereby creating a circulation of waste water liquor from the turbulent zone, down through the mixing zone and around the bouyant media, and up through the draft tubes to the turbulent zone.

14 Claims, 4 Drawing Sheets

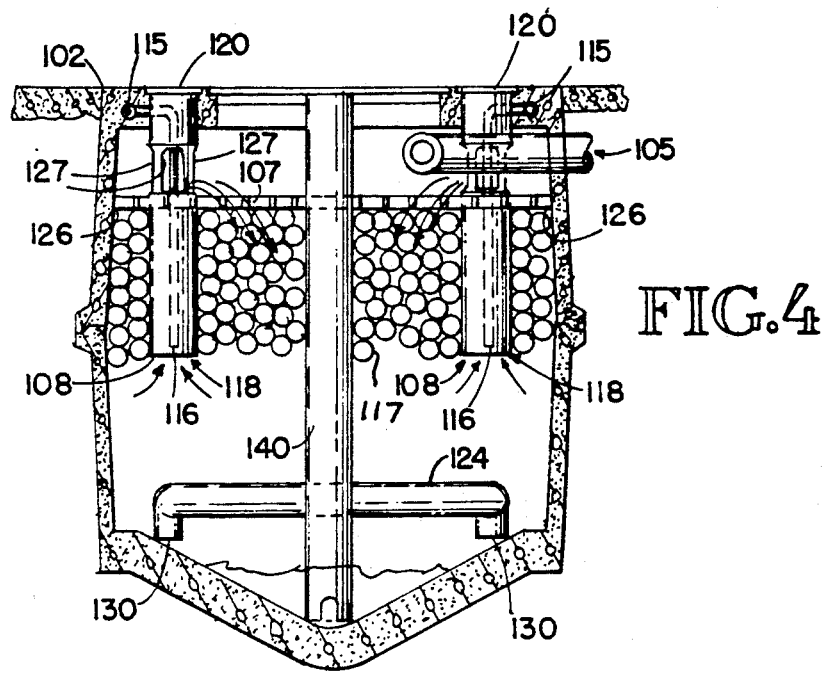
FIG. 4
FIG. 5
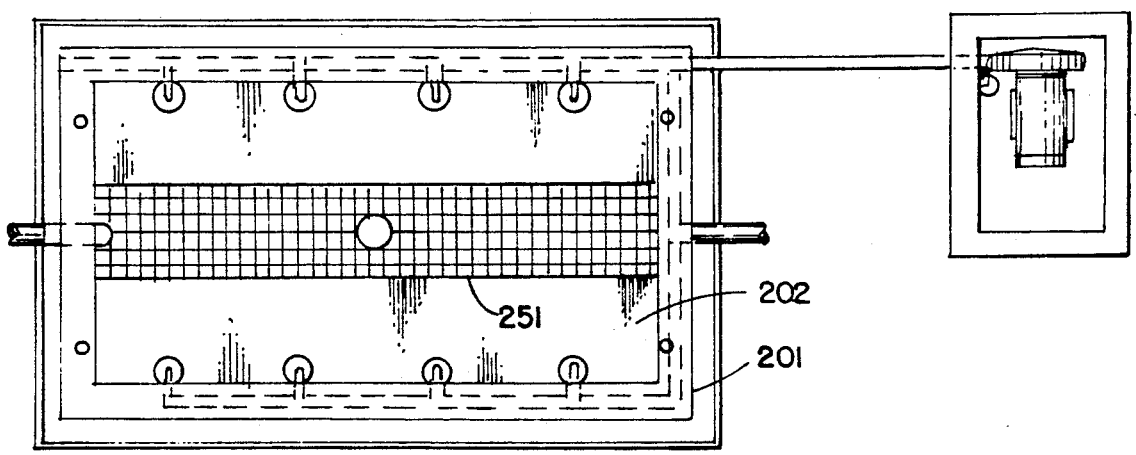

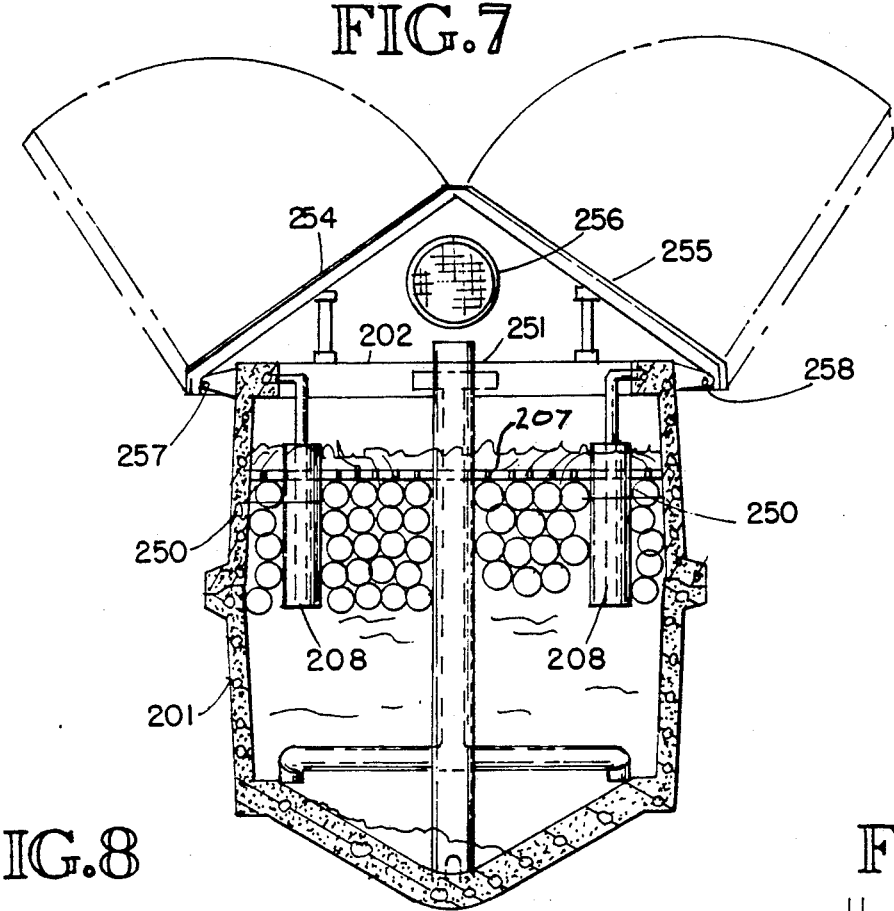
FIG.7
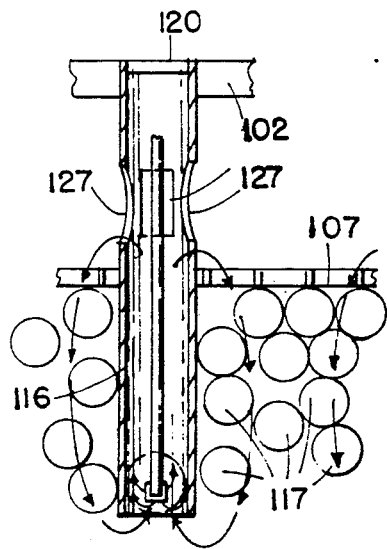
FIG.8
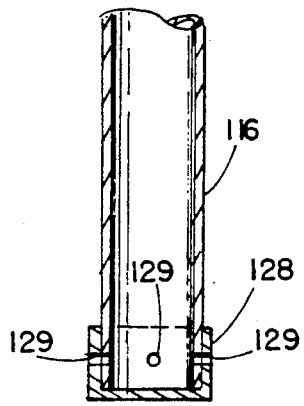
FIG.10
FIG.10
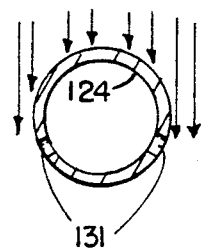
FIG.9

5,030,353

SECONDARY SEWAGE TREATMENT SYSTEM

This application is a continuation of application Ser. No. 07/297,294 filed Jan. 13, 1989, now abandoned.

FIELD OF THE INVENTION

This invention relates to on-site waste water treatment systems, and more particularly to secondary treatment systems.

BACKGROUND OF THE INVENTION

On-site disposal of waste water (sewage) from single family residences and commercial establishments in areas with no conventional sewer system has conventionally been accomplished by a septic tank system. The anaerobic effluent discharged from the septic tank, after settling of the solids portion of the incomining waste water, is passed into a subsurface drainfield for percolation into the surrounding soil. Such a system works satisfactorily if properly installed and if proper soil conditions for disposal of the effluent by the drainfield exist. While most residential septic systems work with harmony between the septic tank and drainfield, there are increasing numbers of drainfield failures in commercial systems. Commercial systems where food preparation wastes are involved are particularly susceptible to failure. The high strength and grease content related to food preparation is beyond the capacity of the conventional septic system.

In such systems, heretofore, small treatment plants which make use of chemical and/or biological treatment schemes to render the effluent suitable for disposal have been suggested. These treatment plants usually are designed to replace the concentional septic system. Such treatment plants are generally prohibitively expensive to and generally not economically feasible for treatment of commercial sewage, as from resturants, in rural and semi-rural areas.

SUMMARY OF THE INVENTION

A primary object of the present invention is to provide a secondary sewage treatment system intended to operate in conjunction with a conventional septic system. The system of this invention is designed to be interposed between the septic tank and drainfield to provide a satisfactory effluent to the drainfield. In particular, the present system is specially designed for use in commercial treatment systems that must handle food preparation wastes; and in this environment the system provides an effluent comparable to that which would be produced from a conventional residential septic tank.

Generally speaking, the system of this invention biologically treats biodegradable wastes through aerobic microbial growth on media resulting in the biological oxidation of the waste products. The preferred embodiment of this invention functions as an aeration tank, settling tank and aerobic digester in a single unit. This invention uses buoyant media, as contrasted with fixed or packed media, and consequently does not incur flocculent build-up during operation or the consequent clogging typical of fixed or packed media treatment systems. In the present invention, biological growth takes place in a mixing zone filled with a bouyant media. The bouyant media has a high surface area to volume ratio, a low resistance to liquid flow and a surface condition receptive to aerobic microbial growth.

Waste flow from a septic tank enters the system into a turbulent zone above the mixing zone and begins a continuous cycle, flowing down through the mixing zone and then upward through draft tubes from which it is re-introduced to the turbulent zone. The mixing zone is filled with the bouyant media and the waste flows gently down through the mixing zone in contact with the buoyant media surfaces. The draft tubes are free of buoyant media or any other surfaces on which biomass can collect. The waste liquor is drawn turbulently up through the draft tubes and spills out above the mixing zone into the turbulent zone The turbulent zone is likewise free of buoyant media or any other surfaces on which biomass can collect.

Within the turbulent zone, the boiling action of the liquor, including detergents and other foaming products, produces a foam which accumulates in the area immediately above the turbulant zone. This foaming action provides additional treatment action, with bacteria being evident in the foam, and also enables the system to tolerate occasional overloading such as occurs during peak hours of operation in food service establishments. When overloaded, the system produces more foaming, in which a significant amount of suspended solids and grease and oils are held, thereby delaying treament of these wastes until the system can tolerate them; at which time the foam settles through the turbulent zone into the mixing zone and is incorporated in the waste liquor.

The system provides a settling zone below the mixing zone through which sludge may settle out for separate removal and from which the treated liquor effluent may be discharged into the drainfield. The treated liquor is collected through a manifold positioned midway between the bottom of the mixing zone and the top of the sludge-collecting zone. It then flows through a riser into an outlet leading to the septic system drainfield.

BRIEF DESCRIPTION OF THE DRAWINGS

FIG. 4 is a cross section view taken along the line 4—4 in FIG. 2;

FIG. 5 is a top plan view of another embodiment of the apparatus of this invention;

FIG. 7 is a cross section view taken along the line 7—7 in FIG. 5;

FIG. 8 is a detailed view of the draft tube segment of the FIG. 2 apparatus;

FIG. 9 is a detailed view of the effluent outlet manifold of the FIG. 2 apparatus; and FIG. 10 is a partial view of the air discharge tube employed in the FIG. 8 draft tube segment.

DETAILED DESCRIPTION OF THE INVENTION

The on-site waste water treatment system as herein described may be used for treatment of residential or commercial wastes. However, its primary intended use is for treating commercial wastes which ordinarily cannot be treated with conventional septic systems. The typical effluent from residential and commercial business establishments consists primarily of human waste in admixture with biodegradable materials such as food and other materials associated with food preparation. The waste water to be treated generally contains gravity settleable solids. While any means of effecting solid-liquid separation may be used, the most commonly used method is a septic tank into which the waste water is discharged and the solids allowed to settle by gravity. The effluent leaving the septic tank, or other settling system, is directed into the system of the present invention.

Figure 1:
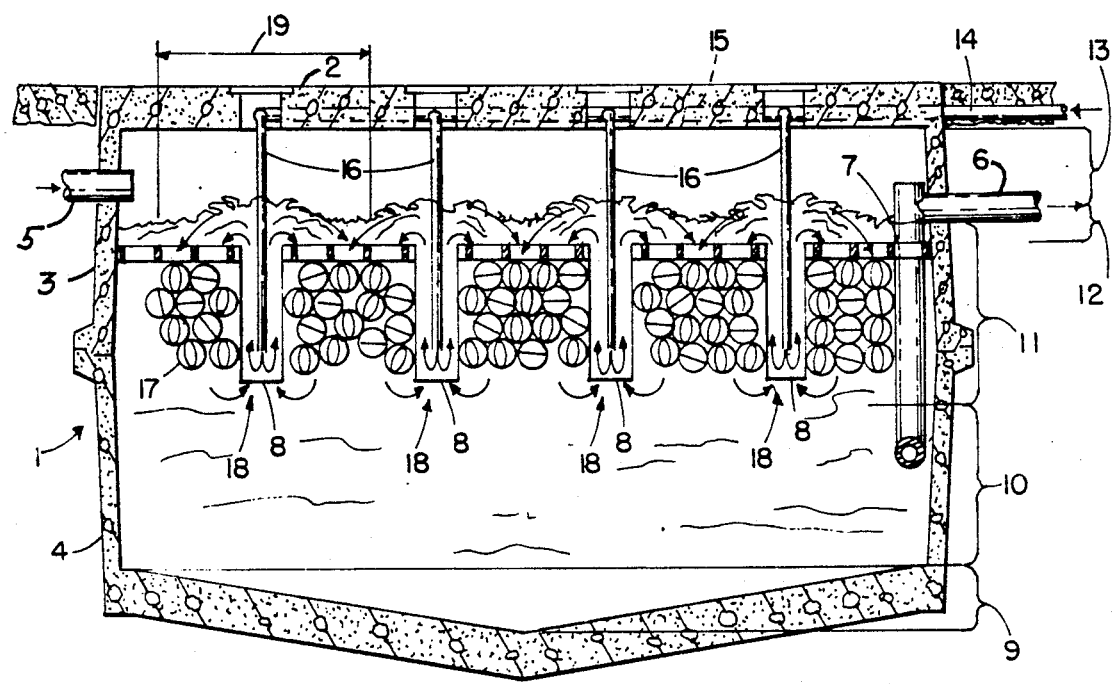
FIG. 1 is a vertical side elevation view, in cross section, of an exemplary embodiment illustrating the principals of operation of the system of this invention.

As shown in FIG. 1, the system of the present invention is provided in a concrete tank 1. The tank 1 has a lid 2, and upper and lower halves 3 and 4. Within the upper half 3, waste influent inlet 5 and waste liquor outlet 6 are provided. Below the level of the inlet and outlet, a grating 7 is provided that extends across the area of the tank interior, from wall-to-wall. A plurality of draft tubes 8 are located and positioned in the tank such that they open at the top co-planar with the top surface of the grating 7 and extend down into the tank to open at their lower ends a distance below the grating 7. The bottom of the tank 1 is sloped to provide a centralized low point. This structure provides a sludge-collecting zone 9 at the bottom of the tank, a settling zone 10 extending above the sludge-collecting zone, a media mixing and aerating zone 11 extending above the settling zone and generally defined by the length of draft tubes 8 inasmuch as it extends from just below the bottom ends of the draft tubes to the grating 7, a turbulent zone 12 extending from the grating 7 to the elevation of the influent inlet 5, and a foam-collecting zone 13 above the turbulent zone 12. An air delivery conduit 14 delivers air via a manifold 15 embedded in the tank lid 2 to individual air delivery tubes 16, one being provided for each draft tube 8. The air delivery tubes 16 extend axially down into the draft tubes 8 and terminate above the bottom end of each respective draft tube. A multiplicity of buoyant media, such as spheres 17, are contained within the tank below the grating 7. When the systems is filled with waste fluid and operational, the tank 1 is filled with waste fluid up to the level of the outlet 6. The buoyant media 17 float and are confined beneath the grating 7 within the media mixing and aerating zone 11; zone 11 being essentially filled with the media 17. The media are preferably composed of bouyant hollow plastic spheres that provide a high surface area to volume ratio on the order of 38 sq. ft./cu. ft. or more Each draft tube - air delivery conduit assembly comprises an air diffuser 18 through which air is ejected into the system without disturbing the surrounding media mixing and aerating zone 11. During operation of the system, influent entering the tank 1 is circulated through the media 17 by the pumping action of the air diffusers 18. As air is discharged into the draft tubes 8, it aerates the liquor within the draft tubes as it rises. The waste liquor is churned and pumped along with the rising air up and out of the draft tubes into the turbulent zone 12.

As waste influent enters the system, the liquor flows gently down through the mixing zone 11, passing through the buoyant media 17 (i.e. around the individual spheres that make up the media). From the bottom of the mixing zone 11, the liquor passes vertically through the separate passageways, provided by the draft tubes 8, between the bottom and top of the mixing zone 11. The air forced into the draft tubes induces a pumping action while aerating the liquor passing upward in the draft tubes. Unlike the gentle flow in the mixing zone 11, the flow within these vertical passageways is relatively turbulent. The volume of air used and the proximity of the vertical flow passageways is such that the outlet circles 19 of flow turbulence between adjacent draft tubes overlap. Consequently, the liquor is continuously circulated in a flow path, including the mixing zone 11 and the vertical flow passageways, at a flow rate and under conditions suitable for promoting thorough mixing of the liquor with the buoyant media, and suitable for maintaining aerobic microbial growth on the buoyant media. If the flow rate of the liquor through the mixing zone 11 is too turbulent, microbial growth will be washed off the buoyant media. On the other hand, if the flow rate through the buoyant media is too slow, excessive microbal growth will accumulate and may cause clogging. When the flow rate is correct, excessive microbial growth falls off the buoyant media and is naturally recycled. Because the media is not fixed or packed, the individual buoyant elements that make up the buoyant media can rotate and tip over as growth builds up. The buoyant media is thus self-cleaning. Dead growth will fall from the buoyant media and settle through the settling zone 10, forming sludge in the sludge-collecting zone 9. Periodically the sludge may be pumped out and discarded or recyled.

Figure 2:
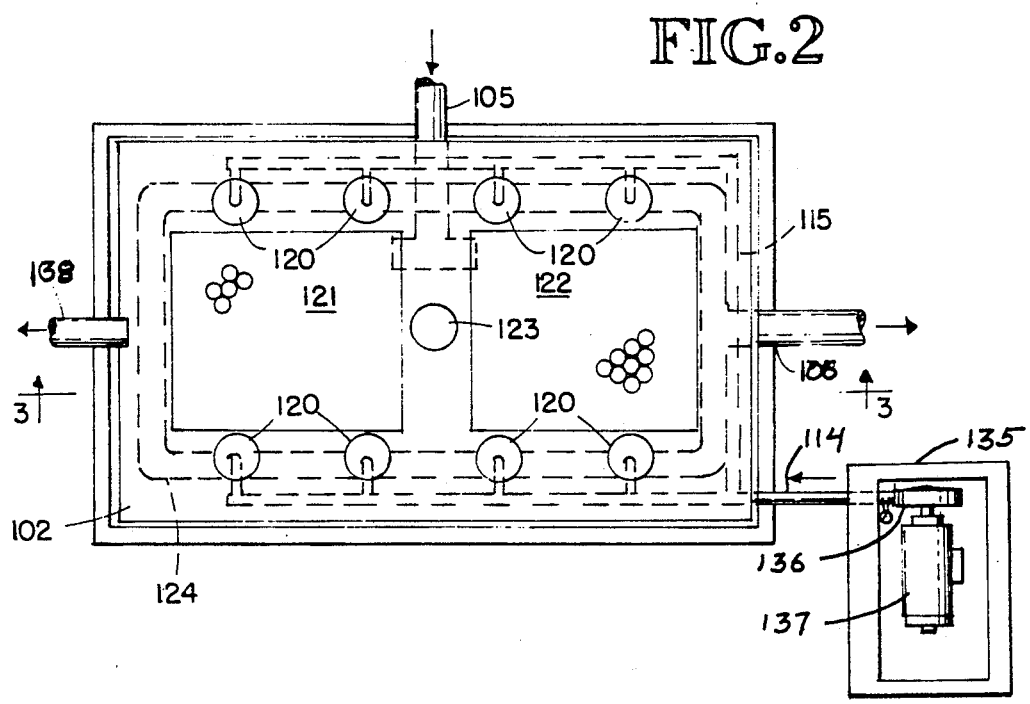
FIG. 2 is a top plan view of a preferred embodiment of the apparatus of this invention.
Figure 3:
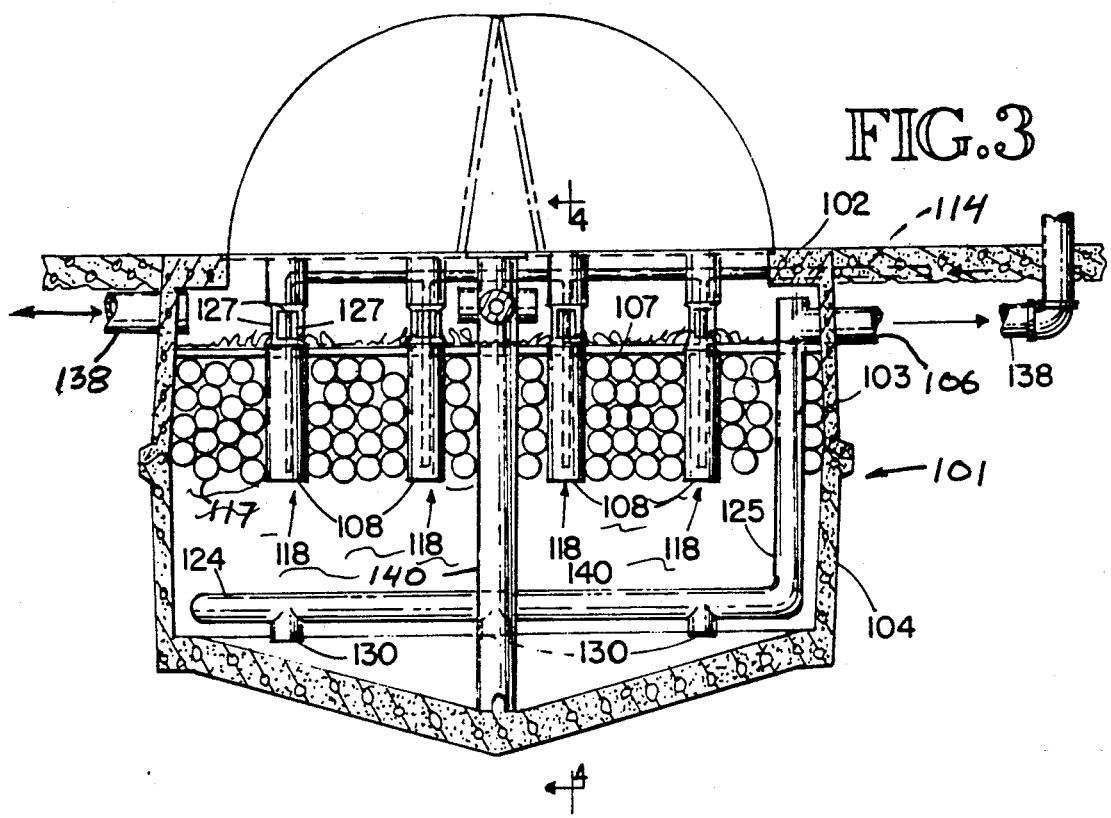
FIG. 3 is a cross section view taken along the line 3—3 in FIG. 2.
Figure 6:
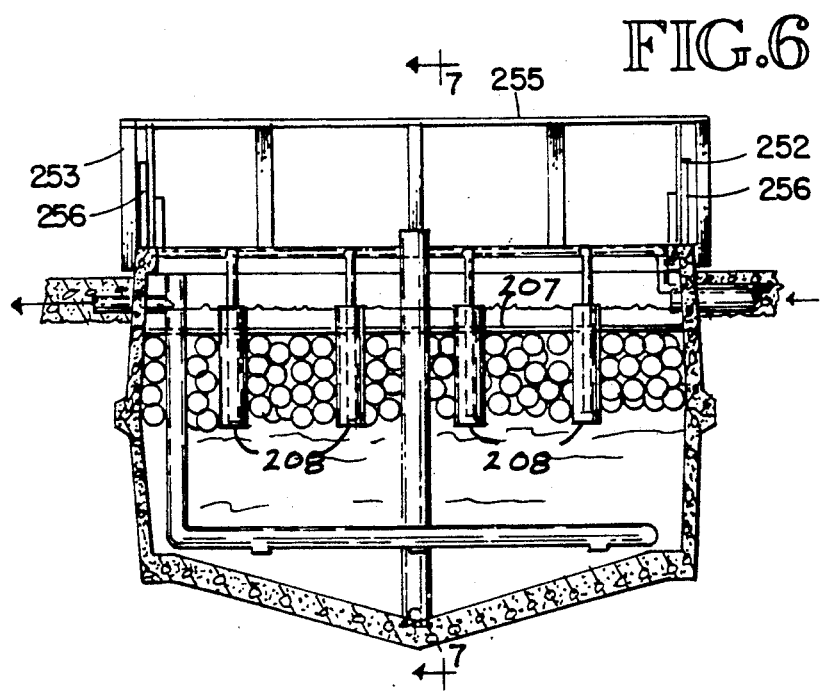
FIG. 6 is a cross section view taken along the line 6—6 in FIG. 5.

One preferred embodiment that incorporates the features of the FIG. 1 system and functions in accordance with the description of the FIG. 1 system is shown in FIGS. 2-4. A similar system is shown in FIGS. 5-6.

With reference to FIGS. 2-4, this embodiment comprises a cast concrete tank 101 having top and bottom halves 103 and 104 joined at a circumferential seam, and a lid 102. The lid is provided with a plurality of air diffuser openings arranged in two rows, each opening being closed by a traffic-bearing clean-out cover 120, and a pair of access openings located between the two rows of air diffuser openings. The access openings are closed by traffic-bearing steel doors 121-122. The access openings are separated by a mid-span lid portion that contains a sludge pump-out opening closed by a traffic-bearing clean-out cover 123.

An influent inlet conduit 105 enters from the side of the tank 101 and branches at a Tee toward the center of the tank to provide two influent discharge openings into the tank's interior. An effluent discharge conduit 106 enters from one end of the tank 101 and is connected to a liquor-collecting manifold 124 by a riser 125. Manifold 124 is located between the bottom of the settling zone and the top of the sludge-collecting zone.

A grating 107 is positioned within the tank's interior and fastened to the tank inner wall by brackets 126. The grating 107 is positioned just below the elevation of the outlet conduit 106 as shown. Axially below the air diffuser openings, the grating 107 is provided with apertures for the draft tubes 108. Draft tubes 108 are provided that extend from the lid air diffuser openings and downward through the grating 107 into the tank's interior. The draft tubes are secured to the lid at their respective lid openings and stabilized by the grating 107. Each draft tube is provided with longitudinal cut-out openings 127 in it's side wall, above the grating 107, that span the turbulent zone's depth to provide for liquor flow from the draft tube interiors into the turbulent zone. An air inlet conduit 114 connects to a manifold conduit 115 embedded in the tank lid. Individual air delivery tubes 116 are connected to the manifold conduit 115 and extended down into the draft tubes to provide, in conjunction with the draft tubes, the multiple air diffuser assemblies 118 required by this invention. As shown in FIG. 10, the bottom end of each air delivery tube 116 is capped and provided with radial apertures 129 through the cap 128 and the tube wall for discharge of air into the draft tube passageway. This capped feature prevents bouyant media elements from accidentally becoming lodged in the draft tubes, as might tend to occur while the tank is being filled for example. As in FIG. 1, the mixing zone is substantially filled with the buoyant media elements 117.

The bottom outlet manifold conduit 124 is provided with several downward-opening inlets 130 as shown in FIGS. 3 and 4. These large openings prevent the manifold from becoming anaerobic. Along the length of the manifold conduit, moreover, the semi-clarified effluent liquor passes through a plurality of apertures 131. These apertures, as shown in FIG. 9, are located below the mid-line of the manifold conduit so that settling particulates will not fall into the apertures.

Air is supplied to the system by air pumping system 135, comprising a fan 136 and an air pressure and volume regulator 137. Excess air is vented from the tank 107 through air vent conduit 138 extending into the foam collecting zone.

A sludge removal conduit 140 extends downward from the top lid clean-out opening to the bottom of the tank for removal of sludge from the sludge-collecting zone. Side openings are provided in the bottom removal conduit 140, as shown in FIGS. 3 and 4 to facilitate sludge removal.

A 1680 gallon tank sized as shown in FIGS. 2-4 would conveniently hold 100 cubic feet of 3.5 inch diameter Jaeger Tri-Pak Polypropylene media elements. This media has a ratio of 38 square feet of area per cubic foot of volume. This would yield 3800 square feet of media area. Compressed air could be supplied by a 2.5 horsepower Gast model R5125-1 fan at 160 cfm free air. A unit of this capacity could handle 700 gallons of waste water from a restaurant per day and yield household-type effluent to the drainfield after a 58 hour retention time at maximum hydraulic capacity. If lower waste strength is desired, the unit could be operated at a lower flow rate or two such units could be connected in series between the septic tank and the drainfield. This unit has demonstrated that it has the capacity to cope with shock loading, whether due to increases in waste strength or hydraulic loading or both. In normal operation, the unit does not accumulate sludge in the sludge-collecting zone and there will be little or no need for periodic pump outs.

The embodiment shown in FIGS. 5-6 is similar in most structural respects to the FIGS. 2-4 embodiment. In this embodiment, however, the grating 207 and the draft tubes 208 are supported in a different manner within the tank 201. Also, the draft tubes 208 do not extend above the turbulent zone inasmuch as they are supported from below, rather than from the overhead tank lid as in the FIGS. 2-4 embodiment. In the present embodiment, the grating 207 is supported on brackets 250 that also extend inward to enclose one of the draft tubes 208 at their outer ends, as shown in FIG. 7. Also in this embodiment, the tank lid is configured differently. The lid is provided with a longitudinal rectangular maintainance opening covered by a non-metallic walkway cover 251. A tank cover having a pair of triangular end walls 252 and 253, and with hinged panels 254 and 255 that overlap at their apex to form a weather-tight roof. The end panels are vented at 256 so that excess air from the tank 207 can escape through the walkway 251 to the atmosphere. Roof mounting hinge sets 257 and 258 are attached to tank 207 as shown in FIG. 7. The roof structure may be made of light weight material such as fiberglass so that installation is convenient.

In summary:

A secondary sewage treatment system is provided with vertically-aligned foam collecting, turbulent, mixing, settling, and sludge collecting zones. A grating defines the boundary between the turbulent and mixing zones. Beneath the grating, a bouyant media, such as hollow plastic spheres, are contained and occupy substantially all of the mixing zone. Air diffusers including elongated draft tubes extend from the turbulent zone down through the mixing zone for introduction of air to aerate waste water liquor and to cause the aerated liquor to recirculate up into the turbulent zone, thereby creating a circulation of waste water liquor from the turbulent zone, down through the mixing zone and around the bouyant media, and up through the draft tubes to the turbulent zone.

While the preferred embodiments of the invention have been described herein, variations in the design may be made. For example, various feature of the two embodiments described herein may be substituted for one another or combined, as appropriate. As another example, the secondary treatment system apparatus of this invention might be incorporated into a combination treatment tank that would have a first section that would function as a conventional septic tank and a second section that would function in accordance with the principles described herein. The scope of the invention, therefore, is only to be limited by the claims appended hereto.

The embodiments of the invention in which an exclusive property is claimed are defined as follows:

1. A process for secondarily treating waste water liquor containing food preparation wastes from which waste solids have been settled out comprising the steps of providing a vertical waste water treatment region having an upper turbulent zone, an intermediate mixing zone, a lower settling zone, and a bottom sludge-collecting zone below said settling zone, each extending across the region with said settling zone and said sludge-collecting zone occupying a major portion of said region; providing a plurality of vertical aerating zones extending through said mixing zone and being in fluid communication with the bottom of said mixing zone and with said turbulent zone; providing a barrier between said turbulent and mixing zones to retain a bouyant media within said mixing zone and prevent such bouyant media from escaping into said turbulent zone; providing a bouyant media in sufficient volume to substantially fill said mixing zone; introducing waste water liquor into said treatment region in said turbulent zone to fill said treatment region up to and including said turbulent zone, and to float said bouyant media into occupancy of said mixing zone, beneath said barrier; introducing air into said aerating zones in sufficient quantity to create a pumping effect of a magnitude that will continuously draw waste liquor from the bottom of said mixing zone, aerate the withdrawn waste liquor portion and expel the aerated portion into said turbulent zone with sufficient force to create turbulence within said turbulent zone, and that will cause waste liquor to pass through said barrier and into and gently downwardly through said mixing zone whereby aerobic microbial growth on said bouyant media will be established; regulating air introduction into said aerating zones to establish a non-turbulent flow rate of waste liquor through said mixing zone sufficient to enable said bouyant media to be self-cleaning but insufficient to wash said microbial growth off said bouyant media; permitting treated waste liquor to settle from said mixing zone into said settling zone in the absence of aeration below said mixing zone; permitting waste liquor portions to settle out from said settling zone into said sludge-collecting zone in the absence of aeration; and drawing off treated waste liquor from within said settling zone.

2. The process of claim 1 wherein initial treatment of said waste liquor is accomplished in a conventional septic tank system with the effluent therefrom constituting the influent to said treatment region; and wherein the effluent from said treatment region is introduced to a septic tank drain field.

3. The process of claim 2 wherein said buoyant media is provided in a form having at least about 38 sq. ft. of surface 4. The process of claim 2 including providing a foam-collecting zone above said treatment region; and wherein sufficient turbulence is created in said turbulent zone that waste liquor in said turbulent zone produces foam, enabling additional treatment to occur within the foam thus created and enabling the retention of wastes within the foam until said treatment region can accommodate the retained wastes for further treatment.

5. The process of claim 4 wherein said treatment zone is provided within a tank wherein a grating is supported within said tank to provide said barrier; and wherein draft tubes are provided and positioned through said grating to define said aearating zones.

6. The process of claim 5 wherein said tank is provided with an overhead lid and said draft tubes are extended upward beyond said turbulent zone and secured to said tank lid and suspended therefrom into the tank interior.

7. The process of claim 2 wherein said treatment zone is provided within a tank wherein a grating is supported within said tank to provide said barrier; and wherein draft tubes are provided and positioned through said grating to define said aerating zones.

8. The process of claim 7 wherein said tank is provided with an overhead lid and said draft tubes are extended upward beyond said turbulent zone and secured to said tank lid and suspended therefrom into the tank interior.

9. The process of claim 1 wherein said buoyant media is provided in a form having at least about 38 sq. ft. of surface area per cu. ft. of volume.

10. The process of claim 1 including providing a foam-collecting zone above said treatment region; and wherein sufficient turbulence is created in said turbulent zone that waste liquor in said turbulent zone produces foam, enabling additional treatment to occur within the foam thus created and enabling the retention of wastes within the foam until said treatment region can accommodate the retained wastes for further treatment.

11. The process of claim 10 wherein said treatment zone is provided within a tank wherein a grating is supported within said tank to provide said barrier; and wherein draft tubes are provided and positioned through said grating to define said aerating zones.

12. The process of claim 11 wherein said tank is provided with an overhead lid and said draft tubes are extended upward beyond said turbulent zone and secured to said tank lid and suspended therefrom into the tank interior.

13. The process of claim 1 wherein said treatment zone is provided within a tank wherein a grating is supported within said tank to provide said barrier; and wherein draft tubes are provided and positioned through said grating to define said aerating zones.

14. The process of claim 13 wherein said tank is provided with an overhead lid and said draft tubes are extended upward beyond said turbulent zone and secured to said tank lid and suspended therefrom into the tank interior.

* * * * *